US011756057B2

(12) United States Patent
Soramäki et al.

(10) Patent No.: US 11,756,057 B2
(45) Date of Patent: Sep. 12, 2023

(54) METHOD AND SYSTEM FOR ESTIMATING VULNERABILITY AND SYSTEMIC IMPORTANCE IN TRANSACTION NETWORKS

(71) Applicant: FINANCIAL NETWORK ANALYTICS LTD, London (GB)

(72) Inventors: Kimmo Soramäki, London (GB); Samantha Cook, London (GB)

(*) Notice: Subject to any disclaimer, the term of this patent is extended or adjusted under 35 U.S.C. 154(b) by 0 days.

(21) Appl. No.: 17/022,241

(22) Filed: Sep. 16, 2020

(65) Prior Publication Data

US 2022/0084049 A1    Mar. 17, 2022

(51) Int. Cl.
| | | |
|---|---|---|
| *G06Q 10/06* | (2023.01) | |
| *G06Q 30/02* | (2023.01) | |
| *G06Q 20/06* | (2012.01) | |
| *G06Q 30/0201* | (2023.01) | |
| *G06Q 30/018* | (2023.01) | |
| *G06Q 40/02* | (2023.01) | |
| *H04L 9/40* | (2022.01) | |
| *G06N 7/01* | (2023.01) | |

(52) U.S. Cl.
CPC ........ *G06Q 30/0201* (2013.01); *G06N 7/01* (2023.01); *G06Q 30/018* (2013.01); *G06Q 40/02* (2013.01); *H04L 63/1433* (2013.01)

(58) Field of Classification Search
CPC ......... G06Q 10/06; G06Q 30/02; G06Q 20/06
USPC ...................................................... 705/7.29
See application file for complete search history.

(56) References Cited

U.S. PATENT DOCUMENTS

| | | | |
|---|---|---|---|
| 10,650,150 B1 | 5/2020 | Rajasooriya et al. | |
| 2004/0215551 A1* | 10/2004 | Eder | G06Q 40/08 705/38 |
| 2016/0364794 A1* | 12/2016 | Chari | G06Q 40/02 |
| 2017/0140384 A1* | 5/2017 | Zoldi | G06Q 40/12 |
| 2021/0182859 A1* | 6/2021 | Srinivasa Rao | G06Q 20/065 |

OTHER PUBLICATIONS

International Search Report and Written Opinion of the International Searching Authority issued in International Patent Application No. PCT/IB2021/058459 dated Jan. 12, 2022, 16 pages.

* cited by examiner

*Primary Examiner* — Nga B Nguyen
(74) *Attorney, Agent, or Firm* — RC Trademark Company LLC

(57) ABSTRACT

Disclosed is a method for estimating vulnerability and systemic importance in transaction networks. The method comprises receiving transaction data relating to plurality of nodes of transaction network. The method further comprises determining adjacency matrix and transition matrix from the received transaction data; determining centrality parameter for a node in transaction network by treating the given node as an absorbing node thereby simulating a faulty node, obtaining adjusted transition matrix by removing outgoing connections of the given node from the transition matrix, and determining fundamental matrix indicative of centrality parameter of the given node, based on the adjusted transition matrix. The method further comprises determining rank of a node based on the centrality parameter corresponding thereto, wherein the rank of a given node is indicative of vulnerability of the transaction network in an event of a failure of the given node.

7 Claims, 3 Drawing Sheets

METHOD AND SYSTEM FOR ESTIMATING VULNERABILITY AND SYSTEMIC IMPORTANCE IN TRANSACTION NETWORKS

TECHNICAL FIELD

The present disclosure relates generally to transaction networks; and more specifically, to methods and systems for estimating vulnerability and systemic importance in transaction networks. Moreover, the present application relates to a computer-readable medium carrying instructions that when loaded into and executed by a data processing arrangement causes the data processing arrangement to execute any of the aforementioned method. Furthermore, the present application relates to a software module system comprising software modules to be executed by a data processing arrangement for estimating vulnerability and systemic importance in transaction networks.

BACKGROUND

Financial regulation is a fundamental part of maintaining a safe and efficient global economy. Therefore, to maintain integrity of the global economies, it is important to determine the most important, the most vulnerable, and the most disruptive institutions in the financial system. The financial crisis of 2008-9 underscored the interconnectedness of the global financial system, and also illustrated the fact that the most important institutions are not necessarily the largest but rather the most connected. This realization created new challenges, however, as it is not generally immediately obvious which institutions are the "most central".

In this regard, the global financial system can be represented in the form of a complex network comprising a plurality of nodes linked directly or indirectly with each other. In such a network, the nodes may represent debtors and creditors for example financial institutions (central bank, commercial banks, insurance companies, hedge fund, individual investors and consumers), interconnected with each other through visible (i.e. directly linked) and invisible (i.e. indirectly linked) financial connections. For example, in a payment network, the banks (represented by nodes) transfer payments related to customer requests or their own trading along directed links of the network. The network model of the financial systems helps in understanding the mechanism of operation as well as potential risks in an event of failure or disruption in one or more institutions of the financial system.

With advances in the area of simulations and network science, various groups of researchers, having backgrounds in various disciplines such as economics, finance, statistics, applied mathematics, engineering, and other interdisciplinary fields, have suggested different measures for modeling financial transaction networks. Conventional ways of measuring centrality or a level of influence of a node are based either on local measures or assumed processes. The local measures, such as Degree Centrality, take into account only the immediate neighboring node but do not take into account network structure, and are unlikely to identify institutions that are small but important. Typically, the local measures rely on the balance-sheet information i.e. total value sent and/or received, or number of counterparties, and so on. While the measures of centrality based on assumed processes on the network, such as Closeness Centrality and Betweenness Centrality, Eigenvector Centrality, PageRank algorithm, DebtRank, and so on, can account for neighboring nodes with incoming connections, outgoing connections or a combination thereof, they do not reflect the reality of what happens in financial transaction networks.

In particular, such network centrality measures are based on geodesic (shortest) paths (such as in case of Closeness Centrality and Betweenness Centrality), paths, trails or walks (such as in case of Eigenvector centrality and PageRank algorithm). Centrality measurements characterized (a) by geodesic paths selects the shortest route between two nodes, (b) by paths need not necessarily use the shortest route, but do not visit any node more than once, (c) along trails do not visit any given connection more than once, and (d) as walks are unrestricted in their behavior. Moreover, modeling financial transaction networks based on geodesic paths, paths or trails fails to account for the unrestricted movement of liquidity in the financial transaction networks. Furthermore, while modeling financial transaction networks based on walks can account for the unrestricted flow of liquidity in such networks, walk-based measures such as Eigenvector centrality and Pagerank fail to model the failure of institutions in financial networks.

Advanced algorithms of network theory include for example Craig and von Peter's core-periphery classification. The core-periphery classification identifies the most central set of nodes in a network without explicitly making assumptions about the type of network or its behavior. However, the core-periphery model only identifies nodes as core or periphery, but fails to provide an explicit ranking of individual nodes. Recently, simulations are employed to study the financial connections and potential failure of financial systems. Simulations of failures in financial systems generally focus on system-wide risks and liquidity effects. Moreover, the time taken to obtain a voluminous information, extract and analyze the financial connections and retrieve the results for each and every set of nodes is comparatively slow due to the computational demands associated with this activity. For example, simulation studies can be performed on a financial network, failing each financial institution of the financial network to analyze effects of its failure on the overall financial system. However, performing such simulation studies for a plurality of financial system is highly time-intensive and computationally difficult.

Therefore, in light of the foregoing discussion, there exists a need to overcome the aforementioned drawbacks associated with determining central set of nodes in the financial transaction network and/or vulnerability in overall financial transaction network.

SUMMARY

In addition to the problems as indicated above, the inventors have further realized that conventional centrality models, even if based on walks, fail to accurately estimate the extent of disruption in a network due to a failure of one or more nodes therein. Furthermore, the conventional ways fail to identify the nodes that are most affected by the failure of another node in the system.

As the inventors have further realised after inventive and insightful reasoning, there is a problem, as is discussed briefly above, in that conventional financial transaction models based on geodesic paths are inaccurate in measuring the level of influence of a node in the transaction network and are unlikely to account for the unrestricted movement of liquidity in the transaction networks or identify nodes that are small but important.

One object of the teachings herein is to overcome or at least mitigate the problems of the prior art.

To achieve such an object, the inventors have realized that by utilizing a Markov chain to model the transaction network, they can approximate the results of running a series of failure simulations on the network in order to ascertain or detect vulnerabilities in such a transaction network in an elegant and surprisingly simple manner having great computational benefits!

Also, the inventors have furthermore realized that by treating a node as an absorbing node, an even more advantageous model of the transaction network for ascertaining or detecting vulnerabilities in such transaction network is achieved.

According to one aspect, the object is achieved by providing a method for estimating vulnerability and systemic importance in a transaction network, the method comprising:
 receiving transaction data relating to a plurality of nodes of the transaction network, wherein a given transaction from a first node to a second node is represented as an outgoing connection from the first node to the second node in the transaction network
 determining an adjacency matrix and a transition matrix from the received transaction data;
 determining a centrality parameter for a node in the transaction network, wherein the centrality parameter for a given node is determined by:
  treating the given node as an absorbing node thereby simulating a faulty node,
  obtaining an adjusted transition matrix by removing outgoing connections of the given node from the transition matrix, and
  determining a fundamental matrix indicative of centrality parameter of the given node, based on the adjusted transition matrix; and
 determining a rank of a node based on the centrality parameter corresponding thereto, wherein the rank of a given node is indicative of vulnerability of the transaction network in an event of a failure of the given node.

Embodiments of the present disclosure enable the determination of systemically important nodes in a transaction network as well as predicting the nodes that will be most affected by a failure as well as how the overall transaction network would be affected by a failure or disruption in one or more nodes of the transaction network.

In one embodiment, the method further comprises determining a set of vulnerable nodes having ranks higher than a predefined threshold.

In an embodiment, the plurality of nodes represents financial institutions and wherein the transaction network is a financial transaction network and the transaction data are financial transaction data.

In an embodiment, the vulnerability of the transaction network is determined based on an absorbing Markov chain model.

In an embodiment, the method further comprises assigning ranks to one or more node portfolios, wherein a size of a given node portfolio is smaller than a size of the transaction network.

In an embodiment, the method comprises determining an average distance between pairs of nodes in the transaction network, wherein the average distance is indicative of overall vulnerability of the transaction network.

In an embodiment, the transaction data comprises information relating to some or all of: financial institutions involved in the transactions, types of the transactions, number of transactions, value of each transaction, a date and a time of the transactions.

In an embodiment, the centrality parameter of a given node is a measure of an expected number of steps that are required to reach the given node from another randomly chosen node.

According to one aspect, the object is achieved by providing a computer-readable medium carrying instructions that when loaded into and executed by a data processing arrangement causes the data processing arrangement to execute for estimating vulnerability and systemic importance in a transaction network.

According to one aspect, the object is achieved by providing a software module system comprising software modules to be executed by a data processing arrangement for estimating vulnerability and systemic importance in a transaction network, wherein the software module system comprises:
 a software module for receiving transaction data relating to a plurality of nodes of the transaction network, wherein a given transaction from a first node to a second node is represented as an outgoing connection from the first node to the second node in the transaction network
 a software module for determining an adjacency matrix and a transition matrix from the received transaction data;
 a software module for determining a centrality parameter for each node in the transaction network, wherein the centrality parameter for a given node is determined by:
  treating the given node as an absorbing node thereby simulating a faulty node,
  obtaining an adjusted transition matrix by removing outgoing connections of the given node from the transition matrix, and
  determining a fundamental matrix indicative of centrality parameter of the given node, based on the adjusted transition matrix; and
 a software module for determining a rank of a node based on the centrality parameter corresponding thereto, wherein the rank of a given node is indicative of vulnerability of the transaction network in an event of a failure of the given node.

According to one aspect, the object is achieved by providing a system for estimating vulnerability and systemic importance in a transaction network, the system comprising a data processing arrangement configured to
 receive transaction data relating to a plurality of nodes of the transaction network from a data repository, wherein a given transaction from a first node to a second node is represented as an outgoing connection from the first node to the second node in the transaction network
 determine an adjacency matrix and a transition matrix from the received transaction data;
 determine a centrality parameter for a node in the transaction network, wherein the centrality parameter for a given node is determined by:
  treating the given node as an absorbing node thereby simulating a faulty node,
  obtaining an adjusted transition matrix by removing outgoing connections of the given node from the transition matrix, and
  determining a fundamental matrix indicative of centrality parameter of the given node, based on the adjusted transition matrix; and determine a rank of a node based on the centrality parameter corresponding thereto, wherein the rank of a given node is indicative of vulnerability of the transaction network in an event of a failure of the given node.

In an embodiment, the data processing arrangement is further configured to determine a set of vulnerable nodes having ranks higher than a predefined threshold.

In an embodiment, the plurality of nodes represents financial institutions and wherein the transaction network is a financial transaction network and the transaction data are financial transaction data.

In an embodiment, the vulnerability in the transaction network is determined based on absorbing Markov chain model.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following drawings wherein.

DETAILED DESCRIPTION

The following detailed description illustrates embodiments of the present application and ways in which they can be implemented. Although some modes of carrying out the present teachings have been disclosed, those skilled in the art would recognize that other embodiments for carrying out or practising the present teachings are also possible.

Figure 1:
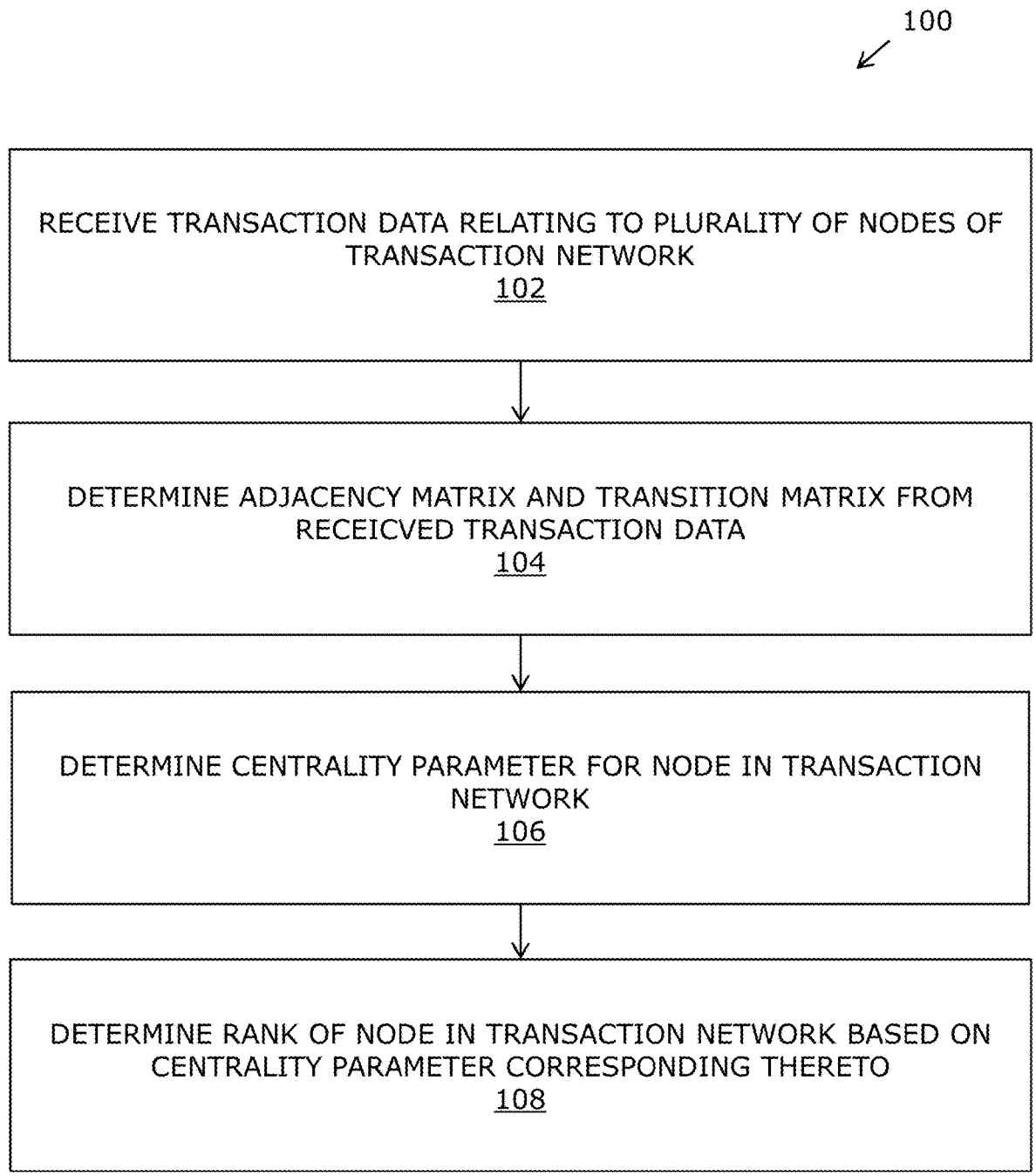
FIG. 1 is an illustration of steps of a method for estimating vulnerability and systemic importance in a transaction network, according to one embodiment of the teachings herein.

Referring to FIG. 1, illustrated are steps of a method 100 for estimating vulnerability and systemic importance in a transaction network, according to one embodiment of the teachings herein. At step 102, transaction data relating to a plurality of nodes of the transaction network is received. Notably, a given transaction from a first node to a second node is represented as an outgoing connection from the first node to the second node in the transaction network. At step 104, an adjacency matrix and a transition matrix are determined from the received transaction data. At step 106, a centrality parameter is determined for a node in the transaction network. The centrality parameter for a given node is determined by treating the given node as an absorbing node thereby simulating a faulty node, obtaining an adjusted transition matrix by removing outgoing connections of the given node from the transition matrix, and determining a fundamental matrix indicative of centrality parameter of the given node, based on the adjusted transition matrix. At step 108, a rank of a node is determined based on the centrality parameter corresponding thereto, wherein the rank of a given node is indicative of vulnerability of the transaction network in an event of a failure of the given node.

The steps 102, 104, 106 and 108 are only illustrative and other alternatives can also be provided where one or more steps are added, one or more steps are removed, or one or more steps are provided in a different sequence without departing from the scope of the claims herein.

Figure 2:
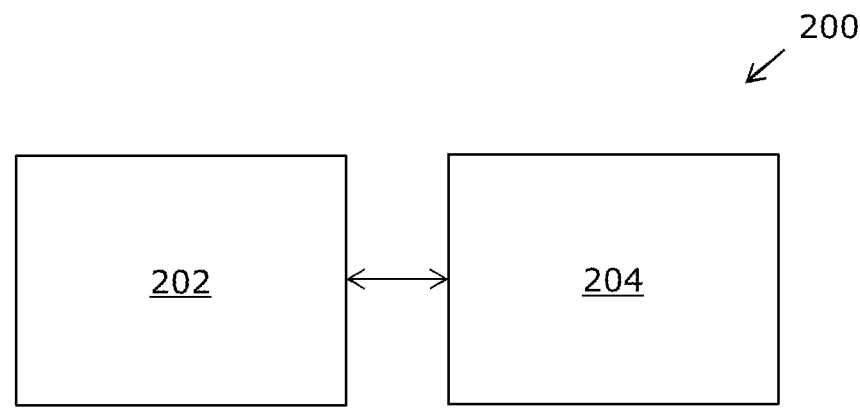
FIG. 2 is a block diagram of a system for estimating vulnerability and systemic importance in a transaction network, according to one embodiment of the teachings herein.

Referring to FIG. 2, shown is a block diagram of a system 200 for estimating vulnerability and systemic importance in a transaction network, according to one embodiment of the teachings herein. The system 200 comprises a data processing arrangement 202. The data processing arrangement 202 is communicably coupled to a data repository 204. The data processing arrangement 202 is configured to receive transaction data relating to a plurality of nodes of the transaction network from a data repository 204, and determine an adjacency matrix and a transition matrix from the received transaction data. The data processing arrangement 202 is configured to determine a centrality parameter for a node in the transaction network and determine a rank of a node based on the centrality parameter corresponding thereto.

Figure 3:
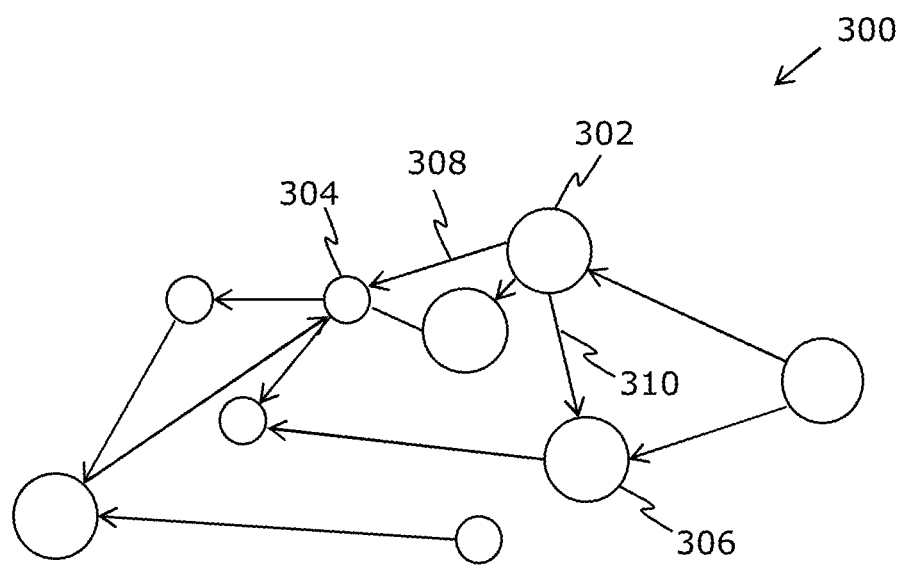
FIG. 3 is a schematic illustration of a transaction network, according to one embodiment of the teachings herein.

Referring to FIG. 3, there is shown a schematic illustration of a transaction network 300, according to one embodiment of the teachings herein. The transaction network 300 comprises a plurality of nodes, such as the nodes 302, 304, 306, and connections, such as the connections 308 and 310, therebetween.

The method 100, the system 200 allow efficient assessment of a network and vulnerabilities therein. Specifically, the method uses transaction data containing information such as sender, receiver, date and time of transactions, the number and/or value of transactions, and so on, between all set of nodes involved in a transaction process during a fixed time period. Such information allows for the creation of transaction networks, and subsequent measurement of centrality or level of influence of a node at different time scales, for example weekly, daily, or hourly. Moreover, the model assigns ranks (namely, weight or score or value) to each node within the transaction network, based on the interconnectedness thereof. Typically, a higher rank is associated with a greater level of influence of said node within the transaction network. As a result, connections with high-ranking centrality nodes contribute more to the rank of the connecting node as compared to equal number of connections to low-ranking centrality nodes. In an embodiment, the model assigns weights to connections between each set of connecting nodes within the transaction network. The weights represent either the number of transactions between a pair of nodes or a total value of assets exchanged therebetween. Therefore, connection having higher weights associated therewith contribute more to the rank of the connecting nodes. The weight of the connections further contribute to the transition probabilities of transaction network. Furthermore, the method in the form of a metric enables identification of systemically important institutions (represented by nodes) as well as prediction of the institutions most affected by a failure in another node. The method accurately represents the flow of liquidity through the transaction network as well as how the transaction network would be affected by a failure or disruption in one or more institutions of the transaction network.

Furthermore, the method of the present disclosure is relatively straightforward and can be implemented in any programming language and, results can be obtained in significantly short time periods, even for large datasets. Moreover, the method of the present disclosure provides ranking of institutions. Beneficially, simulation studies of the method of the present disclosure shows that such ranking of institutions is highly correlated with the magnitude of disruption in the system associated with the institutional failure. In other words, the ranking of nodes enables identification of institutions whose failure would be most disruptive to the system overall.

Examples of embodiments according to the teachings herein will now be described in detail with simultaneous reference to FIGS. 1, 2, and 3.

Throughout the present disclosure, the term "data processing arrangement" as used herein relates to programmable and/or non-programmable components configured to execute one or more software application for storing, processing, sharing data and/or set of instructions. Optionally, the data processing arrangement 202 is a set of one or more hardware components or a multi-processor system, depending on a particular implementation. More optionally, the data processing arrangement 202 includes, for example, a component included within an electronic communications network. Additionally, the data processing arrangement 202 includes one or more data processing facilities for storing, processing, sharing data and/or set of instructions. Optionally, the data processing arrangement 202 includes functional components, for example, a processor, a memory, a network adapter and so forth.

Throughout the present disclosure the term "transaction network" as used herein refers to a network model created from transaction data. The transaction network 300 allows consumers, merchants, financial institutions and other third parties to interact with each other and strengthen their relationships by enabling efficient and secure transaction processing and reducing risks. The transaction network 300 comprises a plurality of nodes, such as the nodes 302, 304, 306, and connections, such as the connections 308 and 310, therebetween. In an embodiment, the plurality of nodes, such as the nodes 302, 304, 306, represent financial institutions. The financial institutions include, but are not limited to, banks, central banks, regulators, auditors, investors, payment and securities settlement systems, and other third parties. The connections, such as the connections 308 and 310, of the transaction network 300 define counterparty relationships between a corresponding pair of nodes of the transaction network 300. The connections 308, 310 depict flow of the assets from one node (namely sender) to another node (namely receiver) through the transaction network 300. A node having at least one outgoing connection is referred to as a non-absorbing node and a node with no outgoing connection is referred to as an absorbing node.

In an embodiment, the transaction network, such as the transaction network 300, is a financial transaction network and the transaction data are financial transaction data. The term "transaction data" as used herein refers to information relating to transactions. The transaction data is stored in a data repository 204 held and maintained by at least one key financial institution in the financial system such as a central bank. Optionally, the system 200 comprises the data repository 204.

The data repository 204 stores any type of transaction data in a structured or unstructured format. In an embodiment, the transaction data comprises information relating to some or all of: financial institutions involved in the transactions, types of the transactions, number of transactions, value of each transaction, a date and a time of the transactions. The transaction data further includes information related with an asset or a group of assets such as sender data, receiver data, date and time of a transaction data, the number and/or value of a transaction data, and so on. The transaction data allows for the creation of the transaction networks, and subsequent measurement of centrality or level of influence of a node at different time scales, for example weekly, daily, or hourly. Typically, the transaction happens between one node to another node of the transaction network at a fixed time period. In this regard, nodes in a transaction network correspond to a given time scale associated with the transaction data. Optionally, the transaction is processed in a local transaction network (namely, a small-scale transaction network) or a global transaction network (namely, a large-scale transaction network. Optionally, an asset or a group of assets being transacted in a transaction network include, but are not limited to, financial assets (for example monetary funds, shares, mutual funds, cryptocurrency, and so on), payments or securities.

In an embodiment, the vulnerability of the transaction network 300 is determined based on an absorbing Markov chain model. In particular, the transaction network is modelled as an absorbing Markov chain model. The absorbing Markov chain model is a network model that can be in one of several states and can pass from one state to another state at each time step according to fixed probabilities. The absorbing Markov chain model contains at least one absorbing node and at least one non-absorbing node, and it is possible to go from each non-absorbing node to at least one absorbing node in a finite number of time steps. The flow through the transaction network 300 is modelled as a random walk or an absorbing random walk. Specifically, the absorbing random walk is a random walk that starts from a non-absorbing node and eventually terminates at an absorbing node. Thus, the absorbing Markov chain model, based on the absorbing random walk, accurately represents the flow of liquidity through the transaction network 300 as well as how the transaction network is affected by a disruption or failure in one or more institutions or nodes. In an example, the absorbing Markov chain model for the transaction network 300 has nodes and connections between the nodes representing the flow of liquidity through the transaction network 300. In such example, the absorbing node in the financial transaction network 300 represents an institution in a state of failure or disruption. Such absorbing nodes continue to receive incoming transactions (at least initially), but do not make any outgoing transactions. In such example, the absorbing Markov chain model reflects e.g. the process taking place when a financial institution fails in a payment system such that the failing institution does not make any outgoing payments, and any transactions sent to the failing financial institution remain in its account.

At step 102, transaction data relating to a plurality of nodes, such as the nodes 302, 304, 306, of the transaction network 300 is received. The data processing arrangement 202 is configured to receive transaction data relating to a plurality of nodes of the transaction network 300 from a data repository 204. For a given transaction data, comprising information relating to the plurality of nodes, as input, the transactions may flow between the plurality of nodes in multiple steps. The transactions are initiated from a first node to a second node and are represented as outgoing connections, such as an outgoing connection 308 from node 302 to node 304 in the transaction network 300. Herein, the node 302 is a non-absorbing node and the node 304 is any of a non-absorbing node or an absorbing node. Typically, the absorbing Markov chain model can move from a node 'i' to a node 'j' with a fixed probability, referred to as transition probability ($p_{ij}$), at a next time step. In one such embodiment, where the absorbing Markov chain model can move from a node 'i' to a node 'j' with a transition probability ($p_{ij}$), the node 'i' is referred to as a non-absorbing (or transient) node, and the node 'j' may be another non-absorbing (or transient) node or any absorbing node. The transition probabilities ($p_{ij}$) can be estimated from the transaction data. In an alternate embodiment, both the first node and the second node are the absorbing node itself. In such case, the absorbing Markov chain model can move nowhere from the node 'i', and a transition probability ($p_{ii}$) is 1, wherein the node 'i' is the absorbing node. It will be appreciated that any non-absorbing node in a transaction network can be transformed into an absorbing node by removing its outgoing connections. Moreover, the absorbing Markov model enables assigning ranks (namely, weight or score or value) to each node, by treating each node as an absorbing node, within the transaction network, based on the interconnectedness thereof, and calculating the expected number of steps to reach the absorbing node.

At step 104, an adjacency matrix and a transition matrix are determined from the received transaction data. The data processing arrangement 202 is configured to determine an adjacency matrix and a transition matrix from the received transaction data. Typically, the transaction data is used to identify the flow of the transactions between the plurality of nodes. The flow of transactions is represented as an adjacency matrix, M The adjacency matrix M is a square n×n matrix, where n represents the number of nodes in the transaction network, i.e. for example, the number of financial institutions in the financial transaction network. Moreover, the i, $j^{th}$ entry of the adjacency matrix M consists of either the total number of transactions or the total value of the transactions made from a financial institution i to a financial institution j. In an example, if the adjacency matrix M represents the total number of transactions, the i,$j^{th}$ element of the adjacency matrix M is calculated by counting the number of transactions in the transaction data sent by the financial institution i to the financial institution j. In another example, if the adjacency matrix M represents the total value of transactions, the i,$j^{th}$ element of the adjacency matrix M is calculated by summing the value of each transaction in the transaction data sent by the financial institution i to the financial institution j.

It will be appreciated that the adjacency matrix models transfers between nodes that are not equally likely and where the initial assets are not equally distributed, and where the number of transfers is very large and difficult to analyze as above. In such cases, the transaction network is represented as a transition matrix P. Any network can be represented with an adjacency matrix and such a matrix can be turned into a transition matrix. If M=$[p_{ij}]_{n \times n}$ represents an adjacency matrix, the corresponding transition matrix P is defined by dividing each element of the adjacency matrix M by the sum of the row of said element. Therefore, P=$[p_{ij}/\Sigma_j p_{ij}]_{n \times n}$, where the transition probabilities for a random walk are defined by the link weights $p_{ij}$. Moreover, for the absorbing Markov chain model, having n−1 non-absorbing nodes and one absorbing node, the transition matrix P is represented as:

$$P = \begin{bmatrix} S & T \\ 0 & 1 \end{bmatrix}$$

where the non-absorbing nodes are arranged in the beginning and the absorbing node is arranged at the end in the matrix. In the transition matrix P, S is an (n−1×n−1) submatrix that describes the transition probability of going from a non-absorbing node to another non-absorbing node; T is a non-zero (n−1×1) submatrix that describes the transition probability of going from a non-absorbing node to an absorbing node; 0 is a (1×n−1) zero submatrix that describes the transition probability of going from an absorbing node to a non-absorbing node, since this is prevented in an absorbing Markov chain model, therefore 0 submatrix has all the elements as 0; and 1 is the scalar 1 that describes the transition probability of going from the absorbing node to itself. Here we consider only ranks for individual nodes, i.e. the number of absorbing nodes is equal to 1, but, as detailed above and below, the measure can be easily extended to analyze multiple simultaneous failures as well. It will be appreciated that by ordering rows and columns of the transition matrix such that the absorbing nodes are arranged at the end (i.e. final row and final column) of the transition matrix, the transitions probabilities have not been changed.

At step 106, a centrality parameter for a node, such as the nodes 302, 304, 306, in the transaction network 300 is determined. The data processing arrangement 202 is configured to determine a centrality parameter for a node in the transaction network. The term "centrality parameter" as used herein refers to a measure of network topography and the level of criticality associated with a node in the transaction network 300. The centrality parameter may vary from 0 to 1. Notably, the centrality measure is indicative of integration of a node in the transaction network. It will be appreciated that a node that has a high level of centrality in a transaction network produces a high level of disruption if it fails, on account of the node being connected to a larger number of financial institutions in the transaction network. Beneficially, the more central the node the more it is integrated in the transaction network 300, thus more associated with potential risks. In an example, anode A with a higher centrality parameter is at a centre of a financial transaction network and thus is representative of a primary financial institute that for example is party to a large number or value of transactions, or is connected to many other nodes that are also highly central, while the node B with a low centrality parameter is at a far outreaching network branch and thus has a decentral function. Optionally, the centrality parameter is used to measure or give an indication of a financial institution's global or local functions and influence on neighbouring financial institutions or on a far outreaching financial institutions of the transaction network 300.

In an embodiment, the centrality parameter of a given node, such as the nodes 302, 304, 306, is a measure of the expected number of steps that are required to reach the given node from another randomly chosen node. Specifically, the centrality parameter is a measure of the expected number of steps that are required to reach an absorbing node from any randomly-chosen non-absorbing node. In this regard, the absorbing nodes that require a smaller expected number of steps are considered more central than absorbing nodes that require a large number of steps, and thus are associated with a higher centrality parameter.

The method 100 enables determining the centrality parameter for a given node by treating the given node as an absorbing node thereby simulating a faulty node, obtaining an adjusted transition matrix by removing outgoing connections of the given node from the transition matrix, and determining a fundamental matrix based on the adjusted transition matrix. As discussed in the exemplary implementation above, for a given adjacency matrix, a transition matrix may be obtained by arranging the non-absorbing nodes in the beginning and the absorbing nodes at the end in the transition matrix. Moreover, the adjusted transition matrix is obtained by removing outgoing connections of the given node from the transition matrix. Based on such adjusted transition matrix, a fundamental matrix Q is determined. The fundamental matrix Q is represented as $$Q=(I-S)^{-1}$$

where S is the (n−1×n−1) submatrix (discussed hereinabove) and I is the (n−1×n−1) identity matrix. The i,j$^{th}$ entry of the fundamental matrix Q indicates the expected number of times, starting at the node i, a transaction (random walk process) is expected to visit the node j before absorption.

Beneficially, the absorbing Markov chain model for the financial transaction network enables measurement of distance to a failing node from the other nodes in the financial transaction network via flow of transactions through the financial transaction network. Moreover, failures are more disruptive when they occur in nodes that are more central, i.e. in the nodes that have a higher centrality parameter. A node's centrality parameter denotes the inverse average number of transactions that need to be made for a unit of assets anywhere in the transaction network to reach the node, and takes possible values in the range [0,1]. The centrality parameter's maximum possible value of 1 is obtained, for example, in the case of the center node of a star network, the payments flowing through the spokes of the star network reach the center node in one step.

Moreover, a fundamental matrix Q is generated to obtain information regarding the time to absorption in the absorbing Markov chain model. The total number of steps expected before the absorption equals the total number of visits a transaction is expected to make to all the non-absorbing nodes. An entry $q_{ij}$ of the fundamental matrix Q represents the expected number of visits to the non-absorbing node j before absorption, if the process starts from the non-absorbing node i. The sum of all entries in the row i of the fundamental matrix Q thus represents the expected number of visits to all other non-absorbing nodes before absorption when starting from the node i. The 'distance' or 'random walk distance' from node i to the absorbing node is thus calculated as $\Sigma_j q_{ij}$. The sum of all the entries in the i$^{th}$ row of the Q matrix is obtained by row summation of the Q matrix. The expected distance to the absorbing node is defined as a distance along random walks. It will be appreciated that the distance from one node to another node can only be calculated when a path exists from the non-absorbing node to the absorbing node. Thus, the centrality parameter of each node can be calculated for strongly connected components, and is useful as a centrality measure for strongly connected network. It will also be appreciated that the distance from node i to j is not in general equal to the distance from node j to i.

In an alternate embodiment, for networks that are not strongly connected, the method 100 comprises adding a small constant to the zero elements of the transition matrix. The small constant smoothes the original transition matrix P by adding random jumps. In such case, if we denote the random jump probability as 1−α and the transition matrix as P=[$p_{ij}$]n×n, adding the random jump probability is equivalent to replacing each element $p_{ij}$ of the transition matrix P with $\alpha p_{ij}$+(1−α)/n. In other words, each zero element in the transition matrix P is replaced with (1−α)/n and each non-zero element is multiplied by a and added to (1−α)/n. The centrality parameter of each node can then be calculated for the transition matrix with random jumps included. The resultant transition matrix P corresponds to a strongly connected network, and random walk distances may be calculated for each pair of nodes in the transaction network.

At step 108, a rank of a node, such as the nodes 302, 304, 306 is determined based on the centrality parameter corresponding thereto, wherein the rank of a given node is indicative of vulnerability of the transaction network in an event of a failure of the given node. The data processing arrangement 202 is configured to determine a rank of a node in the transaction network based on the centrality parameter corresponding thereto. The term "rank" as used herein refers to a quantifier representative of vulnerability of the transaction network in an event of a failure of the given node or group of nodes. The rank is typically a number, represented as a fraction of numbers, a decimal number, a percentage, and so forth. The rank assigned to a node (namely, the financial institution participating in the transaction process) is calculated from a network model created from the transaction data and refers to a notion of the node's centrality in the transaction network. In other words, the rank may be assigned to the given node based on the centrality parameter associated thereto. The nodes' centrality parameters are calculated based on the features of the nodes as well as the existing connections between the nodes. A node's centrality parameter is determined on the basis of its expected distance by a random but representative transaction process. The centrality parameter of each node is defined by:

$$\text{centrality} = \frac{n-1}{\Sigma_i \Sigma_j (q_{ij})}$$

where the centrality parameter of a node is determined by inverting the average distance determined from its fundamental matrix Q. The centrality parameter is an inverse function of the expected number of steps required to reach a node from another randomly-chosen node before termination. The absorbing nodes that require a lower expected number of steps are considered to be more central than the absorbing nodes that require a higher expected number of steps.

Figure 4:
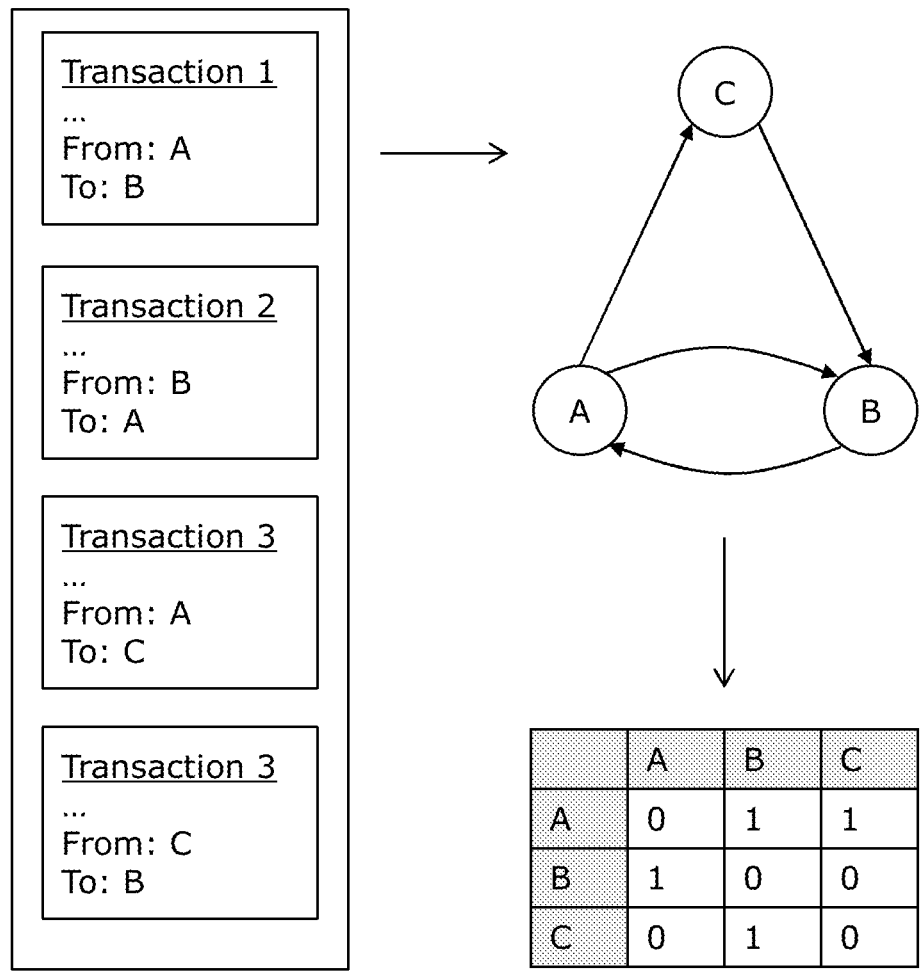
FIG. 4 is an illustration of an exemplary implementation of the determination of an adjacency matrix from transaction data, according to teachings herein.

Referring to FIG. 4, there is shown an illustration of an exemplary implementation of the determination of an adjacency matrix from transaction data, according to teachings herein. The transaction network contains three financial institutions A, B and C (each represented as a node), wherein the transaction data illustrates a payment from the financial institution A to the financial institution C, a payment from the financial institution C to the financial institution B and a payment from the financial institutions A and B to each other. Using such transaction data, a transaction network between the nodes A, B and C is determined. Subsequently, an adjacency matrix for the transaction network is determined, wherein the rows represent nodes sending the payments and columns represent nodes receiving the payments.

In an example, when there is one transaction from A to C, the value of the A,C$^{th}$ element of the adjacency matrix is one.

It will be appreciated that FIG. 4 represents a simplified illustration of the transaction data and corresponding transaction network, for the sake of clarity. The implementation depicted herein does not intend to limit the scope of the claims in any manner. Herein, in a conventional scenario, the centrality parameter of a financial institution is determined by using only the adjacency matrix. The centrality parameter of a financial institution is determined by removing all outgoing connections from the node representing said financial institution and calculating the expected number of payments performed before reaching said node in the transaction network. Firstly, the centrality parameter of the node A is calculated by converting it to an absorbing node by removing its outgoing connections. In such case, a unit of assets from the node B will reach the node A in one transfer, and a unit of assets from the node C will reach the node A in two transfers (i.e. one transfer from the node C to the node B and another from the node B to the node A). Assuming that the initial assets held by each financial institution are equally distributed, and thus an asset transfer is equally likely to start at the node B or the node C, the expected number of transfers before reaching the node A is $(1)(0.5)+(2)(0.5)=1.5$, and thus the centrality of the node A is $1/1.5=0.667$.

Secondly, a centrality parameter of the node B is calculated by converting it to an absorbing node by removing its outgoing connections. In such case, a unit of assets from the node C will reach the node B in one transfer, and a unit of assets from the node A will reach the node B either directly (i.e. one transfer from the node A to the node B) or via the node C (i.e. one transfer from the node A to the node C and then to the node B in two transfers). Assuming that the initial assets held by each financial institution are equally distributed, and thus an asset transfer is equally likely to start at the node A or the node C, the expected number of transfers before reaching the node B is $(1)(0.5)+(1)(0.5)(0.5)+(2)(0.5)(0.5)=1.25$, and thus the centrality of the node B is $1/1.25=0.8$.

Thirdly, a centrality of the node C is calculated by converting it to an absorbing node by removing its outgoing connections. In such case, a unit of assets from the node A will reach the node C directly (i.e. one transfer from the node A to the node C) or via the node B. If said transfer is via the node B, a transfer from the node A to the node B and back to the node A, and then again either to the node C (i.e. three transfers from the nodes A to B and back to the node A, and then finally to the node C) or to the node B (i.e. five transfers from the node A to the node B and back to the node A, and again from the node A to the node B and back to the node A, and then finally to the node C; and so on) is possible. Therefore, the unit of assets from the node A will reach the node C in either one transfer, in three transfers, in five transfers, and so on. Moreover, a unit of assets from the node B will reach the node C via the node A in at least two transfers (i.e. transfer from the node B to the node A and then to the node C). However, if said transfer is via the node A, a transfer from the node A to the node B and back to the node A, and then again either to the node C (i.e. three transfers from the nodes A to B and back to the node A, and then finally to the node C) or to the node B (i.e. five transfers from the node A to the node B and back to the node A, and again from the node A to the node B and back to the node A, and then finally to the node C; and so on) is possible. Therefore, the unit of assets from the node B will reach the node C in either two transfers, in four transfers, in six transfers, and so on. Assuming that the initial assets held by each financial institution are equally distributed, and thus an asset transfer is equally likely to start at the node A or the node B, the expected number of transfers before reaching the node C is $(1)(0.5)(0.5)+(3)(0.5)^3+(4)(0.5)^4+\ldots+2(0.5)(0.5)+(4)(0.5)^3+(6)(0.5)^4+\ldots$, which can be solved analytically or numerically and is equal to 3.5. Thus, the centrality of the node C is $1/3.5=0.286$.

In the above exemplary implementation, the node B has the highest centrality parameter. It will be appreciated that the above example is to be generalized for cases where transfers between nodes are not equally likely and where the initial assets are not equally distributed, and where the number of transfers is very large and difficult to analyze as above.

In another embodiment, the financial transaction network is modelled based on distribution of initial assets held by the financial institutions represented by nodes. In this regard, the financial institutions with higher asset holdings are more likely to make transfers to other financial institutions than the financial institutions with low asset holdings. If all nodes are equally likely to make transfers, the centrality parameter of each node is equal to $(n-1)/\Sigma_i\Sigma_j q_{ij}$. This can be expressed in matrix notation as $(wQ1)^{-1}$, where w represents a row vector of length n−1 with each value equal to $1/(n-1)$ and 1 represents a column vector of ones. In general, the centrality parameter of each node can be calculated for any set of starting probabilities assigned to the nodes, according to $(wQ1)^{-1}$, where w represents the row vector (length n−1) of starting probabilities for each node. Starting probabilities may be calculated, for example, as each node's starting assets as a proportion of total assets in the system or as the proportion of total transfers made by each node.

In an embodiment, the method 100 further comprises calculating centrality parameters and assigning ranks to one or more node portfolios, wherein a size of a given node portfolio is smaller than a size of the transaction network. A portfolio of nodes is a cluster or collection of nodes that may be interrelated or be of special interest to regulators or investors. The node portfolios may be of any size smaller than the total number of nodes in the transaction network. Assigning ranks to one or more node portfolios is on the basis of the expected distance or number of steps before arriving at any of the nodes in the node portfolio when started from another randomly-chosen node in the network. Node portfolios of interest are ranked in the same way as individual nodes, the only difference being that there are now m absorbing nodes rather than a single absorbing node, with m equal to the number of nodes in the portfolio. Optionally, the node portfolios of different sizes may be compared and assigned ranks. The rank is determined for a given node portfolio, with m as the node portfolio size and starting probabilities w corresponding to the n-m other nodes in the transaction network. In this regard, a larger node portfolio of non-central nodes may be assigned a lower rank than a smaller node portfolio of highly central nodes.

In an embodiment, the method 100 further comprises determining the vulnerabilities of nodes in the network to a disruption in another node. The vulnerability of a given node is measured as the inverse of the distance from a disrupted node to a given node. Additionally, the method comprises determining a set of vulnerable nodes having ranks higher than a predefined threshold. Optionally, the predefined threshold is determined by a user of the transaction data. More optionally, the user of the transaction data is a banker, regulator, auditor, or any other third-party person appointed by a financial institution party to or having an interest in said financial transaction network. In an example, the predefined threshold is 0.4 for all nodes of a given transaction network. In such case, the nodes having ranks higher than a predefined threshold of 0.4, for example, from 0.5, 0.6, 0.7, 0.8, 0.9, to 1, are the vulnerable nodes. Thus, the ability to accurately rank nodes and identify vulnerable nodes in the financial system is very valuable for banks, asset managers, insurers and regulators of the financial system.

In an embodiment, the method 100 enables identification of vulnerability of an individual node to disruption in the case of a disruption at another node. To calculate the vulnerability of a given node to a disruption at another node, the transition matrix P' is arranged such that the node for which the vulnerability is required to be determined is arranged at the end in the transition matrix P'. The transition matrix P' is represented as:

$$P' = \begin{bmatrix} S' & T' \\ 0 & 1 \end{bmatrix}$$

As described above, from P' a corresponding fundamental matrix Q' is obtained, and the vulnerability of the node is determined as the sum of the entries of Q' in the row that corresponds to the disrupted node. In other words, if a node i is disrupted, the vulnerability of a node j is determined by first treating the node j as an absorbing node and calculating the distance of the node i to the node j. We then calculate the inverse distance and use that inverse as the measure of vulnerability. Nodes with a higher distance (lower vulnerability) from the disrupted node are less susceptible to disruption themselves than are nodes with a lower distance (higher vulnerability) from the disrupted node.

In an embodiment, the method 100 comprises determining an average distance between all pairs of nodes in the transaction network, wherein the average distance is indicative of overall vulnerability of the transaction network. The average distance is a measure of the number of steps to reach a randomly-chosen absorbing node when starting from another randomly-chosen node. Transaction networks with a higher average distance between pairs of nodes are generally sparser, and may be overall less vulnerable to random disturbances, as the high average distance between nodes mean disturbances will take longer time (or time-steps) to propagate. The average distance may be used to compare the relative vulnerabilities or two contemporaneous networks, for example the payment systems of two different countries.

In an embodiment, the average distance may also be used to track and monitor an individual transaction system over time, where an abrupt change in the average distance of the given transaction system is correlated with a disruption or other abnormal change in the behavior of one or more nodes in the given transaction system. The calculation of the average distance between pairs of nodes may include the addition of a random jump probability to the network's transition matrix (as described above). In an alternate embodiment, the average distance between pairs of nodes in a transaction network enables ranking the nodes based on their importance in the transaction network. Optionally, the average distance between pairs of nodes enables modeling the effect on the transaction network if one of the nodes is removed therefrom. In this regard, more central nodes lead to larger changes in the average distance upon their removal from the transaction network. If $d_{jk}$ represents the expected distance from a node j to a node k, then the centrality of a node i is expressed as:

$$\frac{\sum_{j \neq i, k \neq i} d_{jk}}{\sum_{j,k} d_{jk}^{-i}}$$

where the numerator represents the average distance between all pairs of nodes (not including node i) in the original network, and the denominator represents the average distance between all pairs of nodes in the network with node i removed. Moreover, such method of ranking can also be extended to node portfolios.

Further, an embodiment of the teachings described herein provides a computer-readable medium carrying instructions that when loaded into and executed by a data processing arrangement (such as the data processing arrangement 202) causes the data processing arrangement to execute the aforesaid method 100.

Optionally, the computer-readable medium is a tangible device for storing instructions for use by an instruction execution device. The computer-readable medium can direct a computer, other programmable data processing apparatus, or other devices to function in a particular manner, such that the instructions stored in the computer-readable medium cause a series of steps to implement the function specified in a flowchart and/or a schematic block diagram corresponding to the instructions. The computer-readable medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Further, an embodiment of the teachings described herein provides a software module system comprising software modules to be executed by a data processing arrangement (such as the data processing arrangement 202) for estimating vulnerability and systemic importance in a transaction network, wherein the software module system comprises:
- a software module for receiving transaction data relating to a plurality of nodes of the transaction network, wherein a given transaction from a first node to a second node is represented as an outgoing connection from the first node to the second node in the transaction network
- a software module for determining an adjacency matrix and a transition matrix from the received transaction data;
- a software module for determining a centrality parameter for each node in the transaction network, wherein the centrality parameter for a given node is determined by:
  - treating the given node as an absorbing node thereby simulating a faulty node,
  - obtaining an adjusted transition matrix by removing outgoing connections of the given node from the transition matrix, and
  - determining a fundamental matrix indicative of centrality parameter of the given node, based on the adjusted transition matrix; and
- a software module for determining a rank of a node based on the centrality parameter corresponding thereto, wherein the rank of a given node is indicative of vulnerability of the transaction network in an event of a failure of the given node.

Throughout the present disclosure, the term "software module" refers to a software program comprising executable instructions to perform one or more distinctive data processing operations. In an example, the software modules of the software module system may include, but are not limited to, a transaction data receiving software module, a matrix determining software module, a centrality determining software module, a rank determining software module. The software module may be stored as an instruction on a computer-readable medium (as discussed above) and executed by the data processing arrangement (such as the data processing arrangement 202). Optionally, the software module system is a set of one or more software modules as a part of a software instruction or instruction (as mentioned above). However, each software module serves a unique and separate operation. The software modules may be pre-installed on a system or can be downloaded from a client network, a remote data storage, or internet. The software modules may be a System, Applications and Products (SAP) module, an enterprise resource planning (ERP) software, and so on.

In an embodiment, all software modules of the software module system are implemented as separate software modules. In another embodiment, two or more software modules of the software module system are implemented as an integrated software module.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for estimating vulnerability and systemic importance in a financial transaction network, the method comprising:
   receiving, via a data processing arrangement, financial transaction data, from a data repository, relating to a plurality of nodes of the financial transaction network, wherein the data processing arrangement is communicably coupled to the data repository, wherein the plurality of nodes represent financial institutions, and wherein a given financial transaction from a first node of the plurality of nodes to a second node of the plurality of nodes is represented as an outgoing connection from the first node to the second node in the financial transaction network;
   determining, via the data processing arrangement, an adjacency matrix and a transition matrix from the received financial transaction data;
   determining, via the data processing arrangement, a centrality parameter for a node of the plurality of nodes in the financial transaction network, wherein the centrality parameter for the given node is determined by:
      treating the given node as an absorbing node thereby simulating a faulty node,
      obtaining an adjusted transition matrix by removing outgoing connections of the given node from the transition matrix, and
      determining a fundamental matrix indicative of centrality parameter of the given node, based on the adjusted transition matrix;
   determining, via the data processing arrangement, an average distance between pairs of nodes, of the plurality of nodes, in the financial transaction network, wherein the pairs of nodes comprise the given node; and
   determining, via the data processing arrangement, vulnerability of the financial transaction network in an event of a failure of the given node based on
      an absorbing Markov chain model, wherein the absorbing Markov chain model contains at least one absorbing node and at least one non-absorbing node, wherein the absorbing node continues to receive incoming transactions but does not make any outgoing transactions,
      the determined average distance between the pairs of nodes, and
      a rank of the given node, wherein the rank of the given node is determined, via the data processing arrangement, based on the centrality parameter corresponding to the given node, and wherein the highest ranks indicate most important and most disruptive institutions in the financial transaction network.

2. The method according to claim 1, further comprising assigning ranks to one or more node portfolios, wherein a size of the given node portfolio is smaller than a size of the financial transaction network.

3. The method according to claim 1, wherein the financial transaction data comprises information relating to some or all of: financial institutions involved in the transactions, types of the transactions, number of transactions, value of each transaction, a date and a time of the transactions.

4. The method according to claim 1, wherein the centrality parameter of the given node is a measure of an expected number of steps that are required to reach the given node from another randomly chosen node.

5. A non-transitory computer-readable medium carrying instructions that when loaded into and executed by a data processing arrangement causes the data processing arrangement to execute operations, the operations comprising:
   receiving, via a data processing arrangement, financial transaction data, from a data repository, relating to a plurality of nodes of the financial transaction network, wherein the data processing arrangement is communicably coupled to the data repository, wherein the plurality of nodes represent financial institutions, and wherein a given financial transaction from a first node of the plurality of nodes to a second node of the plurality of nodes is represented as an outgoing connection from the first node to the second node in the financial transaction network;
   determining, via the data processing arrangement, an adjacency matrix and a transition matrix from the received financial transaction data;
   determining, via the data processing arrangement, a centrality parameter for a node of the plurality of nodes in the financial transaction network, wherein the centrality parameter for the given node is determined by:
      treating the given node as an absorbing node thereby simulating a faulty node,
      obtaining an adjusted transition matrix by removing outgoing connections of the given node from the transition matrix, and determining a fundamental matrix indicative of centrality parameter of the given node, based on the adjusted transition matrix;

determining, via the data processing arrangement, an average distance between pairs of nodes, of the plurality of nodes, in the financial transaction network, wherein the pairs of nodes comprise the given node; and determining, via the data processing arrangement, vulnerability of the financial transaction network in an event of a failure of the given node based on
- an absorbing Markov chain model, wherein the absorbing Markov chain model contains at least one absorbing node and at least one non-absorbing node, wherein the absorbing node continues to receive incoming transactions but does not make any outgoing transactions,
- the determined average distance between the pairs of nodes, and
- a rank of the given node, wherein the rank of the given node is determined, via the data processing arrangement, based on the centrality parameter corresponding to the given node, and wherein the highest ranks indicate most important and most disruptive institutions in the financial transaction network.

6. A software module system comprising software modules, which are stored in a non-transitory computer-readable medium, to be executed by a data processing arrangement for estimating vulnerability and systemic importance in a financial transaction network, wherein the data processing arrangement is communicably coupled to the data repository, wherein the software module system comprises:

a software module for receiving financial transaction data relating to a plurality of nodes of the financial transaction network, wherein the plurality of nodes represents financial institutions, and wherein a given financial transaction from a first node of the plurality of nodes to a second node of the plurality of nodes is represented as an outgoing connection from the first node to the second node in the financial transaction network;

a software module for determining an adjacency matrix and a transition matrix from the received financial transaction data;

a software module for determining a centrality parameter for a node of the plurality of nodes in the financial transaction network, wherein the centrality parameter for the given node is determined by:
- treating the given node as an absorbing node thereby simulating a faulty node,
- obtaining an adjusted transition matrix by removing outgoing connections of the given node from the transition matrix, and
- determining a fundamental matrix indicative of centrality parameter of the given node, based on the adjusted transition matrix;

a software module for determining an average distance between pairs of nodes, of the plurality of nodes, in the financial transaction network, wherein the pairs of nodes comprise the given node; and a software module for determining vulnerability of the financial transaction network in an event of a failure of the given node based on
- an absorbing Markov chain model, wherein the absorbing Markov chain model contains at least one absorbing node and at least one non-absorbing node, wherein the absorbing node continues to receive incoming transactions but does not make any outgoing transactions,
- the determined average distance between the pairs of nodes, and
- a rank of the given node, wherein the rank of the given node is determined based on the centrality parameter corresponding to the given node, and wherein the highest ranks indicate most important and most disruptive institutions in the financial transaction network.

7. A system for estimating vulnerability and systemic importance in a financial transaction network, the system comprising a data processing arrangement communicably coupled to the data repository, configured to receive financial transaction data relating to a plurality of nodes of the financial transaction network from a data repository, wherein the plurality of nodes represents financial institutions, and wherein a given financial transaction from a first node of the plurality of nodes to a second node of the plurality of nodes is represented as an outgoing connection from the first node to the second node in the financial transaction network;

determine an adjacency matrix and a transition matrix from the received financial transaction data;

determine a centrality parameter for a node of the plurality of nodes in the financial transaction network, wherein the centrality parameter for the given node is determined by:
- treating the given node as an absorbing node thereby simulating a faulty node,
- obtaining an adjusted transition matrix by removing outgoing connections of the given node from the transition matrix, and
- determining a fundamental matrix indicative of centrality parameter of the given node, based on the adjusted transition matrix;

determine an average distance between pairs of nodes, of the plurality of nodes, in the financial transaction network, wherein the pairs of nodes comprise the given node; and determine vulnerability of the financial transaction network in an event of a failure of the given node based on
- an absorbing Markov chain model, wherein the absorbing Markov chain model contains at least one absorbing node and at least one non-absorbing node, wherein the absorbing node continues to receive incoming transactions but does not make any outgoing transactions,
- the determined average distance between the pairs of nodes, and
- a rank of the given node, wherein the rank of the given node is determined based on the centrality parameter corresponding to the given node, and wherein the highest ranks indicate most important and most disruptive institutions in the financial transaction network.

* * * * *